United States Patent
Görl et al.

(10) Patent No.: US 6,825,262 B2
(45) Date of Patent: Nov. 30, 2004

(54) PULVURENT RUBBER COMPRISING CARBON BLACK FILLER, PROCESS FOR THEIR PREPARATION AND APPLICATION

(75) Inventors: Udo Görl, Recklinghausen (DE); Matthias Schmitt, Neckargemünd (DE); Reinhard Stober, Hasselroth (DE); Andreas Gouw, Haltern (DE)

(73) Assignee: PKU Pulverkautschuk Union GmbH, Marl (DE)

( * ) Notice: Subject to any disclaimer, the term of this patent is extended or adjusted under 35 U.S.C. 154(b) by 112 days.

(21) Appl. No.: 10/183,435

(22) Filed: Jun. 28, 2002

(65) Prior Publication Data

US 2003/0144406 A1 Jul. 31, 2003

(30) Foreign Application Priority Data

Jun. 28, 2001 (DE) .......................... 101 31 327

(51) Int. Cl.$^7$ .............................. C08K 9/00; C08K 3/34
(52) U.S. Cl. ...................... 524/495; 524/496; 523/215; 525/332.6
(58) Field of Search ................. 524/495, 496; 523/215; 525/332.6

(56) References Cited

U.S. PATENT DOCUMENTS

| | | | | |
|---|---|---|---|---|
| 3,909,281 A | * | 9/1975 | Yamawaki et al. | 106/285 |
| 4,032,501 A | | 6/1977 | Schulz | |
| 4,250,082 A | * | 2/1981 | Sommer et al. | 523/334 |
| 6,433,064 B1 | * | 8/2002 | Gorl et al. | 524/492 |

FOREIGN PATENT DOCUMENTS

EP   1 127 911   8/2001

* cited by examiner

*Primary Examiner*—Katarzyna Wyrozebski
(74) *Attorney, Agent, or Firm*—Oblon, Spivak, McClelland, Maier & Neustadt, P.C.

(57) ABSTRACT

The invention relates to a process for preparing fine-particle free-flowing rubber powders, composed of carbon black fillers and a rubber, prepared by solution polymerization. The process operates on the basis of a two-phase system involving transfer of the organic rubber phase in a non-aggressive manner into the inorganic filler suspension, without addition of chemicals. A rubber/carbon black composite is formed. The process comprises measures to avoid clumping of product in the aqueous phase. After mechanical water removal and thermal drying, the product obtained flows freely and is a storage-stable powder or pellet and are markedly superior to the standard both in their processing and in their rubber-technology property profile.

9 Claims, No Drawings

PULVURENT RUBBER COMPRISING CARBON BLACK FILLER, PROCESS FOR THEIR PREPARATION AND APPLICATION

BACKGROUND OF THE INVENTION

1. Field of the Invention

The present invention relates to a process for preparing carbon-black-filled rubber powders using rubbers prepared in and/or present in organic solvents, and to the resultant powders and their use in the rubber-processing industry.

2. Description of the Background

U. Görl and K. H. Nordsiek in *Kautsch. Gummi Kunstst.* 51 (1998) 250; and U. Görl and H. Lauer in *Gummi, Fasern Kunstst.* 53 (2000) 261 and R. Uphus, O. Skibba, R. H. Schuster and U. Görl in *Kautsch. Gummi Kunstst.* 53 (2000) 276 disclose the reasons for, and benefits from, the use of rubber powders, and also disclose possible processes for preparation of the rubber powders. The interest in pulverulent rubbers can be explained as an inevitable consequence of the processing technology used in the rubber industry, where rubber mixtures are prepared at high costs because of the time, energy and manpower needed to produce the rubber powders. The main reason for this is that crude rubber material is procured in the form of bales and the remaining constituents of the rubber material which is subject to vulcanization have to be incorporated into the rubber phase.

Comminution of the bale and intimate mixing with fillers, mineral oil plasticizers, and vulcanization auxiliaries takes place on rolls or in internal mixers, in a number of process stages. Between the stages, the mixture is generally cooled on a batch-off system, laid out in milled sheet form on pallets, and put into intermediate storage. Downstream of the internal mixers or rolls the rubber material is subjected to appropriate extrusion or calendering processes.

The only way to avoid this very complicated method of rubber processing is to use completely new process technology. For some time, therefore, there have been discussions on the approach of using free-flowing rubber powders which allow rubber mixtures to be processed as simply and rapidly as thermoplastic powders or pellets.

Rubber products are generally produced by the rubber industry, by polymerization of various and appropriate monomers, by two fundamentally different processes:

a) Polymerization in Water (Emulsion Polymerization)

As suggested by the title of this process, this process embodiment involves monomer polymerization in water initiated by a free-radical, with the aid of suitable initiator molecules, to give polymers of high molecular weight. If emulsifiers are present, the form in which the rubber molecules are present after the polymerization is as finely divided droplets in water. The term latex or rubber emulsion is used in this context. The latex of emulsion produces the raw rubber material, in turn, for the preparation of rubber powder from the aqueous phase, the powder generally being produced by acid-catalyzed coprecipitation after addition of fillers.

U. Görl and K. H. Nordsiek in *Kautsch. Gummi Kunstst.* 51 (1998) 250; U. Görl and H. Lauer in *Gummi, Fasern Kunstst.* 53 (2000) 261; R. Uphus, O. Skibba, R. H. Schuster and U. Görl in *Kautsch. Gummi Kunstst.* 53 (2000) 276; DE 28 22 148, DE 37 23 213, DE 37 23 214, EP 99 911 7844.5, DE 198 154 53.4, DE 198 43 301.8 and DE 100 56 636.0 are all relevant literature showing developments in this area.

It should merely be stated that the best known rubbers which are prepared in, or are present in, water include natural rubber (NR), emulsion styrene-butadiene rubber (ESBR), nitrile rubber (NBR), and chloroprene rubber (CR). All of these types of rubber may be modified with fillers, e.g. industrial carbon blacks or precipitated silicatic fillers, to give rubber powders.

b) Polymerization in an Organic Solvent

The second large group of rubbers is that of products which are generally polymerized anionically in an organic solvent and therefore are also present in this solvent after the polymerization. Important rubbers prepared in this way include styrene-butadiene rubber (LSBR), butadiene rubber (BR), butyl and halobutyl rubbers, and also ethylene-propylene rubbers with (EPDM) or without (EPM) a copolymerized tercomponent.

The process for preparing a rubber powder from solution polymers, which are dissolved in organic solvent, has to take account of this completely different type of rubber starting material. In contrast to the aqueous rubber emulsion, the following new problems arise:

Direct addition of the filler, in particular of the carbon black, to the rubber solution is problematic, because the filler (lipophilic) absorbs all of the solvent and the rubber/filler mixture therefore clumps, making it difficult to prepare a free-flowing rubber powder. The high adsorptive forces generated by the carbon black, furthermore, bind the solvent, and it is therefore difficult to remove the solvent quantitatively from the product, even under conditions of distillation. A product of this type used in the rubber industry would pose a risk of continuing unacceptable emission of traces of solvent during processes.

Direct preparation of the rubber powder from the polymer solution makes it difficult to take measures to control (reduce) tackiness, this being a precondition for a free-flowing product which is capable of being conveyed and silo storage.

In the case of rubber powders made from aqueous rubber emulsions, this could be achieved by applying a separate filler layer around each grain of rubber during coagulation of the latex with certain adjustments to pH.

In an organic solvent, on the other hand, acid-catalyzed coagulation is not possible, and nor therefore is the application of an effective release layer around each grain of rubber. The only method which remains in this case is subsequent powdering of the product, with the risk that this release agent will separate from the grain during conveying and silo storage, resulting in increased tack and then serious problems during processing. Another consequence could be variations in filler level. Another risk when using release agents which are not a constituent of a rubber mixture is that of product contamination, possibly leading to unacceptable impairment of performance profile.

This means that preparation of a carbon-black-filled rubber powder based on solution polymers which are dissolved in an organic solvent with the desired product properties of flowablity, free-flowability, capable of being conveyed and silo storage, storage stablity, etc. can be achieved only if it is possible to combine the abovementioned aspects in a preparation process, and this in principle appears to be possible only by way of a two-phase system (org./aqueous).

The patent literature describes in detail the preparation of carbon-black-filled rubber powders from organic rubber solutions, using a number of processes. DE 28 22 148 describes the preparation of rubber powders both from aqueous rubber emulsions and from rubber solutions. In the latter case, a carbon black suspension treated with acid, $Al_2(SO_4)_3$, and water glass is heated to the boiling point of the solvent, the pH is readjusted, and then the rubber solution is added. While the solvent evaporates, the rubber coagulates on the carbon black under the action of the additives. The rubber powder may be obtained after solid/liquid separation and drying, but no other measures have been taken to inhibit tack and thus ensure that, even after long storage times, the material is capable of being conveyed and being stored in a silo. In practice it has been found that unless precautionary measures are taken a product prepared in this way has at best short-term capability to remain free-flowing, the result therefore being problems with silo storage and automatic feeding of mixers.

DE 21 35 266, DE 22 14 121, DE 26 54 358 and DE 24 39 237 describe processes which first convert the organic rubber solution into an aqueous emulsion with the aid of large amounts of emulsifiers. Carbon black filler suspended in the water is added to this emulsion, and the entire emulsion is made to flow into a heated sodium water glass solution. The result is coprecipitation of rubber and filler with simultaneous removal of the solvent. The process is therefore again based on the principle of coagulation by alteration of pH. The use of the emulsifiers overcomes the problem of the incompatibility of the organic polymer solution phase with the aqueous filler suspension phase. However, the use of such large amounts of emulsifiers is extremely problematic. Firstly, some of the material remains in the finished rubber powder, in some circumstances resulting in a disadvantageous effect on vulcanization-related properties (foreign constituents in the mixture), and secondly the remainder passes into the waste water, which is therefore subject to severe pollution by organic constituents. With this method of preparation, again no adequate measure is described for reducing the tack of the rubber powder. Any such measure is also unlikely to be capable of implementation by this preparative route.

DE 22 60 340 describes a markedly different process, in which the rubber solution with the filler, which by this time is present in dispersion in the organic solvent, is added in a single shot to the rubber solution. The resulting liquid material is then subjected to extremely intimate mixing. There is therefore no preparation of a separate carbon black suspension in water. The solvent is then flash-evaporated by reducing the pressure, using temperatures of up to 280° C. Remaining solvent constituents are removed in a conventional drier. The advantage of this process is certainly that practically no additives have to be used, and the proportion of foreign constituents in the product can therefore be kept low. In addition, there is no production of waste water requiring expensive purification because of organic contaminants.

However, a problematic feature of this process is the use of high pressures and temperatures, which on an industrial scale require very complicated means for their implementation. There is also the risk that sensitive rubbers will be damaged by the rigorous conditions (polymer chain degradation), and that therefore vulcanization-related properties will suffer. Another problem is that solvent residues remain in the product and also have to be removed in a drying step. Indeed, it is doubtful (see page 3) to what extent this is quantitatively possible, since the carbon black is highly adsorptive. The process also fails to address the question as to how the tack of a product obtained in this way can be reduced, and a lastingly free-flowing product capable of being conveyed and silo storage reliably obtained.

SUMMARY OF THE INVENTION

Accordingly, one object of the present invention is to provide a process for preparing a free-flowing rubber powder composed of a rubber/carbon black composite based on solution polymers, where the powder gives a product which meets processing requirements of being free-flowing, capable of being conveyed and silo storable and being capable of automatic feeding and which also meets rubber-technology requirements.

Briefly, this object and other objects of the present invention as hereinafter will become more readily apparent can be attained by a process for preparing fine-particle, free-flowing rubber powders composed of carbon black fillers and a rubber, which comprises:

having prepared the rubber by solution polymerization which is present in an organic solvent solution:

a) first suspending a carbon black in an appropriate amount as a filler for the rubber in water by means of a high-shear mixing device (e.g. Ultra-Turrax), without any other additives, and setting the solids content of the suspension to 0.5–15%, b) separating some of the suspended carbon black from the amount of carbon black of step a), the amount of carbon black separated (in suspension) ranging from 0.5–20%, preferably from 1–10%, based on the total amount of carbon black in the finished product, c) heating the remaining suspension which comprises most of the carbon black to a temperature approximately equal to the boiling point of the organic solvent in which the rubber has been dissolved, d) introducing the rubber solution into the carbon black suspension, with stirring, and at the same time removing solvent by distillation at atmospheric pressure or in vacuo, while the amount of thermal energy supplied being sufficient to keep the temperature of the reaction mixture in the region where evaporation of the solvent is possible, and in this process converting the rubber/filler composite from a two-phase system to a single-phase system, e) removing the organic phase by distillation in water, and not by pH-initiated acid- or base-catalyzed coagulation in water, to transfer the rubber into the aqueous carbon black suspension thereby forming the rubber/filler composite, whereupon, once the solvent has been removed, the product is a rubber/carbon black composite in an aqueous single-phase system;

f) obtaining the product in the form of a rubber/carbon black composite in an aqueous single-phase system after removal of the solvent, g) mixing the carbon black suspension separated in step b) into the aqueous single-phase system, with stirring, h) adding from 1–15 parts, preferably 5–10 parts of a rubber emulsion (e.g. ESBR or NR), based on a total of 100 parts of rubber, to the suspension g), thereby forming a suspension having a pH of 2–7, preferably 2.5–5, by the addition of a Brönsted or Lewis acid, e.g. sulfuric acid, aluminum sulfate etc., to the suspension, i) the result of the processing of steps g) and h) being that, around each grain of rubber powder, an effective carbon black release layer which is mechanically anchored to the solution-polymer-based carbon black/rubber core particle and which subsequently is effective in suppressing the tack of the material in the dried finished product, is formed, j) removing most of the water from the material being processed in steps a) to h) by a suitable solic/liquid method of separation, and k) drying the moist product to a residual moisture level $\leq 2\%$.

DETAILED DESCRIPTION OF THE PREFERRED EMBODIMENTS

Solution rubbers which may be used in the process of the invention include styrene-butadiene rubber with styrene contents of 10–30% and 1,2-vinylbutadiene contents of 20–55%, isoprene rubber, butadiene rubber having a 1,4-cis configuration content >90%, polypentenamer rubber, polyoctenamer rubber, polynorbornene rubber, butyl rubber, and halobutyl rubber, wherein the halogen is chlorine or bromine, ethylene-propylene (EPM) rubber, and ethylene-propylene-diene (EPDM) rubber. The nature of the solvent is not critical, but in many cases is normally cyclohexane.

A feature of the present process is that it requires no, or only a small amount of, additives, such as dispersants, water glass, release agents, and constituents foreign to rubber; and it permits non-aggressive treatment of the product, and at the same time complies with the requirements placed upon flowability and ease of handling in the production processes of the rubber industry, even when long periods of storage are involved.

Carbon-black-filled rubber mixtures based on solution polymers are conventionally mixed in kneaders or on roll mills, and are nowadays used both in the tire industry and in the rubber technology industry. The tire industry primarily uses butadiene rubber, which when filled with various carbon blacks and blended with other rubbers (e.g. NR, ESBR), makes-up a high proportion of rubber mixtures. Besides this, use is also made of other carbon-black-filled solution polymers, such as the halobutyl rubbers in the inner liner sector and, in order of quantity, 3,4-polyisoprene and 1,4-polyisoprene (synthetic natural rubber) as a component of a blend with other polymers.

In the rubber technology industry, the other materials used are primarily the numerous versions of ethylene-propylene-diene (EPDM) rubber and ethylene-propylene (EPM) rubber, various grades of which are also commercially available. Mention should also be made of butyl rubber for bladders and hoses.

The process of the invention has been developed so as to be capable in principle of use for any rubber solution. However, it is advantageous for the process that the boiling point of the solvent be very low, or at least below the boiling point of water. In other cases, it will be clear that steam distillation may be used to remove the solvent.

The carbon blacks which may be used include 30–1000 phr, preferably 40–100 phr, of any of the industrial carbon blacks, these being distinguished by their surface area (iodine adsorption) of 5–1000 m$^2$/g to ASTM D1510–92a and a structure (DBP value) in the range 50–400 mL/100 g to ASTM D2414-92.

The process also embodies the capability of adding, in the process to prepare the product, other constituents usually used in a finished rubber mixture. Examples of these constituents include pale-colored fillers, e.g. precipitated silicas or naturally occurring fillers, processing aids such as mineral oil plasticizers, organosilanes, activators, antioxidants, and cross-linking chemicals, at the concentrations usually used in such applications. The process permits the preparation of fine-particle carbon-black-filled rubber powders based on solution polymers, and these remain free-flowing even after experiencing mechanical stress such as in conveying and packing.

The result of the processing detailed above gives fine-particle rubber powders which are easy to process and generate vulcanizates with improved properties.

Having generally described this invention, a further understanding can be obtained by reference to certain specific examples which are provided herein for purposes of illustration only and are not intended to be limiting unless otherwise specified.

The preparation and application examples below illustrate the workability and advantages of the present invention.
Chemicals Used for Preparing Rubber Powder Embodiments of the Invention
Buna CB 24 in Cyclohexane
Butadiene rubber (Bayer AG)
Buna EP G 6850 in Cyclohexane
Ethylene-propylene-diene rubber (Bayer AG)
Polysar Chlorbutyl 1255 in Cyclohexane
Chlorobutyl rubber (Polysar)
ESBR 1500 Emulsion
Emulsion styrene-butadiene rubber in water (about 20% solids) (DOW)
NR Latex
Natural rubber latex (60% solid content) (Weber und Schaer)
Al$_2$(SO$_4$)$_3$ Solution
Aluminum sulfate solution, 10% strength in water
1) Preparation of a Rubber Powder Using Butadiene Rubber (BR) and N 234 (76 phr)

| Weights used: | 71.65 g | BR rubber in cyclohexane |
| | 3.75 g | ESBR 1500 emulsion |
| | 63.84 g | N 234 (corresponding to 76 phr) |

An Ultra-Turrax high shear mixing device is used to first prepare a 4% strength suspension of the carbon black in the water. This carbon black suspension is divided into two parts. The main quantity comprises 70 phr of carbon black (≅92.1% of the total amount). The second part comprises 6 phr of carbon black (≅7.9% of the total amount). The suspension which comprises the main quantity of the carbon black is then heated to a temperature of about 80° C. and finally brought into contact with the BR solution, by way of a pressure vessel. The transfer of the BR solution (in cyclohexane) takes place, with stirring, within a period of 1.5 h, and during this process the cyclohexane is removed by direct distillation.

After complete removal of the solvent, the desired rubber/carbon black composite is present in particle form, entirely in the aqueous phase. This is allowed to cool, and the mixture is treated with the second carbon black suspension and the ESBR emulsion, and finally the pH is lowered to a value of 4, using sulfuric acid. The result is that, with the aid of the ESBR, the carbon black is absorbed onto the BR/carbon black grains, and forms an effective release layer around each individual grain, this layer subsequently providing effective suppression of caking and clumping of the product.

To conclude, a filtration step (e.g. Büchner funnel) is used to remove most of the water from the mixture, which is then dried in a laboratory fluidized bed to a residual moisture level of ≦2%. Thermogravimetric analysis (TGA) of the material for carbon black content gave a filler level of 76 phr.
2) Preparation of a Rubber Powder Using BR (Butadiene Rubber) and N 234 (47 phr)

| Weights used: | 117.0 g | BR rubber in cyclohexane |
| | 19.0 g | NR latex |
| | 63.9 g | N 234 |

In this example, the carbon black suspension is divided into a main quantity of 40 phr (85.1%) and a second aliquot of 7 phr (14.9%).

The BR solution is added as in Example 1.

After complete removal of the solvent by distillation, the aqueous phase which comprises the rubber powder is treated with the second quantity of carbon black (in suspension form) and with the NR latex, and here again the pH of the suspension is lowered to 4. With the aid of the NR latex as binder, the carbon black becomes absorbed onto the BR/carbon black grains.

The further treatment of the product is as in Example 1. TGA gave a carbon black filler level of 48 phr, this being within the specification.

3) Preparation of a Rubber Powder Based on EPDM and N 550 (80 phr)

| Weights used: | 115.0 g | EPDM solution in cyclohexane |
|---|---|---|
| | 6.1 g | ESBR 1500 emulsion |
| | 96.9 g | N 550 |

The carbon black suspension is prepared as in Example 1. The amounts selected are a main quantity of 74 phr (92.5%) and a second aliquot of 6 phr (7.5% of splitting black).

The suspension which comprises the main quantity of the carbon black is heated to about 80° C. and then treated with the EPDM solution. The EPDM is added as in Example 1.

After complete removal of the cyclohexane, the EPDM/N 550 composite is present in particle form in water. The aqueous phase is allowed to cool and treated with the splitting black suspension and the ESBR emulsion, and the pH is lowered to 4 (addition of $H_2SO_4$).

The result is formation of the desired carbon black release layer, which then provides effective suppression of adhesion in the finished rubber powder.

Work-up of the product and drying take place as described in Example 1.

TGA for carbon black content gives a value corresponding to a filler level of 81 phr.

4) Preparation of a Rubber Powder Based on Chlorobutyl Rubber and N 660 (55 phr)

| Weights used: | 128.4 g | chlorobutyl rubber in cyclohexane |
|---|---|---|
| | 6.8 g | ESBR 1500 emulsion |
| | 74.4 g | N 660 |

The carbon black suspension is prepared as in Example 1. The carbon black is divided into a main quantity of 45 phr (81.8%), and 10 phr (18.2%) of splitting black.

The suspension which comprises the main quantity of carbon black is heated to 80° C. and then treated with the chlorobutyl rubber solution (procedure of Example 1). After removal of the solvent, the chlorobutyl rubber/N 660 composite remains in particulate form in the water. The second aliquot of the carbon black suspension and the ESBR emulsion are added and $Al_2(SO_4)_3$ is used to lower the pH to 4. The carbon black release layer forms.

Work-up of the product takes place as in Example 1. TGA gave a carbon black filler level of 56 phr.

Application-Related Studies on the Rubber Powders of the Invention

Raw materials used

ESBR 1500

Emulsion styrene-butadiene rubber (DOW)

SMR 10

Standard Malaysian rubber (natural rubber)

Buna CB 24

Butadiene rubber with cis content $\geq 96\%$ (Bayer AG)

Enerthene 1849-1

Aromatic mineral oil plasticizer (BP)

Buna EP G 6850

Ethylene-propylene-diene rubber (Bayer AG)

Polysar Chlorbutyl 1255

Chlorobutyl rubber (Polysar)

Lipoxol 4000

Polywax

Sunpar 150

Paraffin-containing plasticizer oil (Sun Oil)

Escorez Resin 1171

Reinforcing resin

Rhenocure TP/S

Zinc dialkyl dithiophosphate (Rhein Chemie)

PVI

N-Cyclohexylthiophthalimide (Monsanto)

Vulcanization-related test methods

| Vulcameter | [-] | DIN 53 529/3 |
|---|---|---|
| Mooney viscosity ML 1 + 4 | [MU] | DIN 53 523/3 |
| Tensile strength | [MPa] | DIN 53 504 |
| 300% modulus | [MPa] | DIN 53 504 |
| Elongation at break | [%] | DIN 53 504 |
| Shore hardness | [-] | DIN 53 505 |
| Abrasion | [mm$^3$] | DIN 53 516 |
| Viscoelastic properties | [-] | DIN 53 513 |
| Dispersion (topography) | [%] | ASTM 2663 |
| Tear propagation resistance | [N/mm] | ASTM D 624 |
| Compression set | [%] | ASTM D 395 |

1) Comparison of a Rubber Powder of the Invention Based on BR/N 234 76 phr with Standard in a Car Tire Tread Mixture Based on ESBR/BR BR mixtures are always used in the rubber industry blended with other rubbers. In the car tire tread sector blends with ESBR are usual. In the truck tire tread sector, however, blends with NR are preferred (Example 2).

The structure of the following comparison is therefore such that a blend of ESBR 70 parts/BR 30 parts/N 234 80 parts was selected for the standard (bale technology). The product of the invention (EPR I) was therefore likewise tested in a blend with a rubber powder based on ESBR/N 234 (PR I). Its preparation follows DE 100 08 877.5.

The following rubber powders were compared with the standard:

| | 1 Standard | 2 |
|---|---|---|
| ESBR 1500 | 70 | — |
| Buna CB 24 | 30 | — |
| EPR I | — | 58.7 |
| PR I | — | 117.7 |
| N 234 | 80 | — |
| Enerthene 1849-1 | 30 | 30 |
| ZnO RS | 3 | 3 |
| Stearic acid | 2 | 2 |
| 6PPD | 2 | 2 |
| Wax | 1 | 1 |
| TBBS | 1.2 | 1.2 |
| Sulfur | 1.5 | 1.5 |

(Rubber powder of the invention, preparation Example 1)

| EPR I BR | 100 parts |
|---|---|
| N 234 | 76 parts |

1a. Mixing Specification

| Pr I (ESBR 1500) | 100 parts |
|---|---|
| N 234 | 76 parts |
| (as in DE 100 08 877.5) | |

1b. Mixing Procedure

Internal mixer: GK 1.5 E; friction 1:1;
ram pressure 5.5 bar
70 rpm; chamber temp. 60° C.; batch temp. ≦ 150° C.

| Standard | EPR I / PR I |
|---|---|
| 0–0.5' Polymers | 0–1' EPR I/PR I, chemicals |
| 0.5–2' Carbon black, oil, ZnO, stea., 6PPD, Wax Aerate and purge 2' Mix and discharge 2–4' | 1' Aerate and purge 1–4' Mix and discharge |

40 rpm; chamber temp. 50° C.; batch temp. ≦110° C.
0–2' Batch stage 1, crosslinking chemicals
2' Discharge and then form milled sheet on roll 1c. Vulcanization-Related Data (Vulcanization Temperature 165° C.)

| Method | Unit | Standard | EPR I/PR I |
|---|---|---|---|
| ML 1 + 4 | [MU] | 58 | 57 |
| Dmax-Dmin | [Nm] | 15.90 | 16.12 |
| $t_{10\%}$ | [min] | 5.1 | 4.2 |
| $t_{95\%}$ | [min] | 22.9 | 24.8 |
| Tensile strength | [MPa] | 16.8 | 18.2 |
| 300% modulus | [MPa] | 8.9 | 9.3 |
| Elongation at break | [%] | 460 | 470 |
| Shore hardness | [-] | 67 | 69 |
| Tear propagation r. Die A | [N/mm] | 39 | 45 |
| DIN abrasion | [mm³] | 63 | 56 |

The rubber powder of the invention blended with ESBR has advantages over the standard in strength, tear propagation resistance, and DIN abrasion.

2) Comparison of a Rubber Powder of the Invention Based on BR/N 234 47 phr with a Standard in a Truck Tire Tread Mixture Based on NR/BR The blend of natural rubber and BR rubber selected for the standard was:

NR 80 parts/BR 20 parts/N 234 50 parts

The following products were used and blended for the rubber powders:

| EPR II (BR) | 100 parts |
|---|---|
| N 234 | 47 parts |

(Rubber Powder of the Invention, Preparation Example 2)

| PR II (NR) | 100 parts |
|---|---|
| N 234 | 47 parts |
| | (as in DE 100 08 877.5) |

2a. Mixing Specification

| | 1 Standard | 2 |
|---|---|---|
| SMR 10 | 80 | — |
| Buna CB 24 | 20 | — |
| EPR II | — | 32.7 |
| PR II | — | 114.3 |
| N 234 | 50 | — |
| ZnO RS | 4 | 4 |
| Stearic acid | 2 | 2 |
| 6PPD | 1 | 1 |
| TMQ | 1.5 | 1.5 |
| Wax | 1 | 1 |
| TBBS | 1.2 | 1.2 |
| Sulfur | 1.4 | 1.4 |
| PVI | 0.15 | 0.15 |

2b. Mixing Procedure

Internal mixer: GK 1.5 E; friction 1:1;
ram pressure 5.5 bar
70 rpm; chamber temp. 60° C.; batch temp. ≦150° C.

| Standard | EPR II / PR II |
|---|---|
| 0–0.5' Polymers | 0–3' EPR II/PR II, ZnO, stea., wax |
| 0.5–2' Carbon black, ZnO, stea., 6PPD, wax, TMQ | 6PPD, TMQ 3–3.15' Discharge 3.5' |
| 2' Aerate and purge 2–4' Mix and discharge | |

40 rpm; chamber temp. 50° C.; batch temp. ≦110° C.
0–2' Batch stage 1, crosslinking chemicals
2' Discharge and then form milled sheet on roll 2c. Vulcanization-Related Data (Vulcanization Temperature 150° C.)

| Method | Unit | Standard | EPR II/PR II |
|---|---|---|---|
| Dmax-Dmin | [Nm] | 16.73 | 16.43 |
| $t_{10\%}$ | [min] | 5.0 | 5.4 |
| $t_{95\%}$ | [min] | 12.4 | 13.3 |
| Tensile strength | [MPa] | 22.8 | 24.7 |
| 300% modulus | [MPa] | 11.5 | 12.0 |
| Elongation at break | [%] | 500 | 490 |
| Shore hardness | [-] | 66 | 68 |
| Tear propagation r. Die A | [N/mm] | 77 | 86 |
| E* 0° C. | [MPa] | 13.3 | 13.4 |
| E' 60° C. | [MPa] | 8.5 | 9.2 |
| E" 60° C. | [MPa] | 1.1 | 1.1 |
| tan δ 60° C. | [-] | 0.132 | 0.115 |

The mixture which comprises the rubber powder of the invention has better strength and tear propagation resistance, and lower loss angle tan δ.

3) Comparison of a Rubber Powder of the Invention Based on EPDM with a Standard Bale Rubber Mixture The following rubber powder was compared with the standard:

| | |
|---|---|
| EPR III (EPDM G 6850) | 100 parts |
| N 550 | 80 parts (preparation Example 3) |

3a. Mixing Specification

| | 1 Standard | 2 |
|---|---|---|
| Buna EP G 6850 | 100 | — |
| EPR III | — | 180 |
| N 550 | 80 | — |
| ZnO RS | 5 | 5 |
| Stearic acid | 2 | 2 |
| Lipoxol 4000 | 4 | 4 |
| Sunpar 150 | 60 | 60 |
| MBT | 1 | 1 |
| TMTD | 0.5 | 0.5 |
| Rhenocure TP/S | 2 | 2 |
| Sulfur | 1.5 | 1.5 |

3b. Mixing Procedure

Internal mixer: GK 1.5 E; friction 1:1;
ram pressure 5.5 bar
80 rpm; chamber temp. 90° C.; batch temp. ≦ 150° C.

| Standard | EPR III |
|---|---|
| 0–1' Polymers | 0–2' EPR III, oil, ZnO, stea. |
| 1–3' Carbon black, oil, ZnO, stea. | 2–3' Polywax |
| 3–4' Polywax | 3' Aerate and purge |
| 4' Aerate and purge | 3–4.5' Mix and discharge |
| 4–5.5' Mix and discharge | |
| 70 rpm; chamber temp. 80° C.; batch temp. ≦ 110° C. | |
| 0–2' Batch stage 1, cross-linking chemicals | |
| 2' Discharge and then form milled sheet on roll | |

3c. Vulcanization-Related Data (Vulcanization Temperature 165° C.)

| Method | Unit | Standard | EPR III |
|---|---|---|---|
| ML 1 + 4 | [MU] | 42 | 41 |
| Dmax-Dmin | [Nm] | 9.99 | 10.71 |
| $t_{10\%}$ | [min] | 0.3 | 0.5 |
| $t_{95\%}$ | [min] | 6.7 | 7.4 |
| Tensile strength | [MPa] | 12.0 | 12.8 |
| 300% modulus | [MPa] | 7.2 | 9.5 |
| Shore hardness | [-] | 54 | 55 |
| Dispersion (Phillips) | [%] | 9 | 9 |
| Compr. Set 72 h/ 70° C. | [%] | 18.2 | 14.1 |
| Compr. Set 48 h/ 120° C. | [%] | 40.8 | 36.9 |

The rubber powder of the invention has higher reinforcement performance (300% modulus) and lower compression set.

4) Comparison of a Rubber Powder of the Invention Based on Chlorobutyl/N 660 55 phr with an Appropriate Standard The following rubber powder was compared with the standard:

| | |
|---|---|
| EPR IV (Chlorobutyl 1255) | 100 parts |
| N 660 | 55 parts (preparation Example 4) |

4a. Mixing Specification

| | 1 Standard | 2 |
|---|---|---|
| Chlorobutyl 1255 | 100 | — |
| EPR IV | — | 155 |
| N 660 | 55 | — |
| ZnO RS | 5 | 5 |
| Stearic acid | 1 | 1 |
| Sunpar 150 | 10 | 10 |
| Escorez resin 1171 | 7 | 7 |
| Insoluble sulfur | 0.6 | 0.6 |
| MBTS | 1.3 | 1.3 |

4b. Mixing Procedure

Internal mixer: GK 1.5 E; friction 1:1;
ram pressure 5.5 bar
80 rpm; chamber temp. 90° C.; batch temp. ≦ 150° C.

| Standard | EPR IV |
|---|---|
| 0–1' Polymers | 0–3' EPR IV, chemicals |
| 1–3.5' Carbon black, oil, ZnO, stea., resin | 3' Aerate and purge |
| Aerate and purge | 3–4' Mix and discharge |
| 3.5' Mix and discharge | |
| 3.5–4.5' | |
| 40 rpm; chamber temp. 40° C.; batch temp. ≦ 100° C. | |
| 0–1.5' Batch stage 1, crosslinking chemicals | |
| 1.5' Discharge and then form milled sheet on roll | |

4c. Vulcanization-Related Data (Vulcanization Temperature 165° C.)

| Method | Unit | Standard | EPR IV |
|---|---|---|---|
| ML 1 + 4 | [MU] | 65 | 62 |
| Dmax-Dmin | [Nm] | 9.77 | 9.88 |
| $t_{10\%}$ | [min] | 1.4 | 1.2 |
| $t_{95\%}$ | [min] | 16.9 | 21.9 |
| Tensile strength | [MPa] | 8.2 | 8.7 |
| 300% modulus | [MPa] | 6.7 | 8.0 |
| Elongation at break | [%] | 370 | 370 |
| Shore hardness | [-] | 57 | 59 |
| Dispersion | [%] | 9 | 9 |

The rubber powder of the invention has higher reinforcement performance.

The disclosure of German priority application Serial Number 10131327.6 filed Jun. 28, 2001 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A process for preparing fine-particle, free-flowing rubber powders composed of carbon black fillers and a rubber, which comprises:

having prepared the rubber by solution polymerization which is present in an organic solvent solution:

a) first suspending a carbon black in an appropriate amount as a filler for the rubber in water by means of a high-shear mixing device, without any other additives, and setting the solids content of the suspension to 0.5–15%;

b) separating some of the suspended carbon black from the main amount of carbon black, the amount of carbon black separated in suspension in this step ranging from 0.5–20%, based on the total amount of carbon black in the finished product;

c) finally heating the suspension which comprises most of the carbon black to a temperature approximately equal to the boiling point of the organic solvent in which the polymer has been dissolved;

d) introducing the rubber solution into the carbon black suspension, with stirring, and in parallel with this introduction, removing solvent by distillation at atmospheric pressure or in vacuo, with the thermal energy necessary for the distillation being supplied to keep the temperature of the reaction mixture in the region where evaporation of the solvent is possible, and in this process converting the rubber/filler composite from a two-phase system to a single-phase system, and removing the organic phase by distillation in water to transfer the rubber into the aqueous carbon black suspension and form the rubber/filler composite, whereupon, once the solvent has been removed, the product is a rubber/carbon black composite in an aqueous single-phase system;

e) mixing the aqueous suspension comprising the product with the carbon black suspension retained in b), with stirring;

f) treating the suspension of d) and e) with 1–15 parts of a rubber emulsion, based on a total of 100 parts of rubber;

g) adjusting the pH of the suspension off) with a Bronsted or Lewis acid to 2–7, where steps e)–f) of the process form, around each grain of rubber powder, an effective carbon black release layer which is mechanically anchored to the solution-polymer-based carbon black/rubber core particle;

h) removing most of the water from the product; and i) drying the moist product to a residual moisture level $\leq 2\%$.

2. The process as claimed in claim 1, wherein the rubber solvent has a high boiling point and is separated by steam distillation.

3. The process as claimed in claim 1, wherein rubber of the rubber solution is a styrene-butadiene rubber having a styrene content of 10–30% and a 1,2-vinylbutadiene content of 20–55%, an isoprene rubber, a butadiene rubber having a 1,4-cis configuration of $\geq 90\%$ a polypentenamer rubber, a polyoctenamer rubber, a polynorbomene rubber, a butyl rubber, or a halobutyl rubber wherein the halogen is chlorine or bromine, an ethylene-propylene (EPM) rubber, or an ethylene-propylene-diene (EPDM) rubber.

4. The process as claimed in claim 1, wherein one or more rubber emulsions based on ESBR or NR is added to the filler/rubber suspension in an amount, based on the total amount of rubber within the rubber powder, that does not exceed 15 phr (parts per hundred rubber).

5. The process as claimed in claim 1, wherein the carbon black fillers comprise 30–1000 phr of industrial carbon blacks with a an iodine adsorption surface area of 5–1000 $m^2/g$ and a (DBP value) in the range 50–400 mL/100 g.

6. The process as claimed in claim 1, wherein the amount of carbon black filler ranges from 40–100 phr.

7. The process as claimed in claim 1, wherein the free-flowing rubber powders further comprise at least one other chemical, process aid, or filler employed in rubber technology.

8. A free-flowing rubber/filler masterbatch as prepared by the process as claimed in claim 1.

9. A method of preparing vulcanizable rubber mixtures, which comprises:

combining the free-flowing rubber/filler masterbatch of claim 8 with other rubber products.

* * * * *